(12) United States Patent
Lu et al.

(10) Patent No.: US 10,805,079 B2
(45) Date of Patent: Oct. 13, 2020

(54) METHOD FOR SECURING AN AUTOMATED SYSTEM

(71) Applicants: Gemalto Inc., Austin, TX (US); SafeNet Canada Inc., Ottawa, Ontario (CA)

(72) Inventors: HongQian Karen Lu, Austin, TX (US); Michael Gardiner, Carleton Place (CA)

(73) Assignees: THALES DIS FRANCE SA, Meudon (FR); THALES DIS CPL CANADA, Inc., Ottawa, Ontario (CA)

( * ) Notice: Subject to any disclaimer, the term of this patent is extended or adjusted under 35 U.S.C. 154(b) by 168 days.

(21) Appl. No.: 15/983,233

(22) Filed: May 18, 2018

(65) Prior Publication Data

US 2019/0356487 A1 Nov. 21, 2019

(51) Int. Cl.
*H04L 9/16* (2006.01)
*H04L 9/08* (2006.01)
*G06F 21/60* (2013.01)

(52) U.S. Cl.
CPC ............. *H04L 9/16* (2013.01); *H04L 9/085* (2013.01); *H04L 9/088* (2013.01); *H04L 9/0869* (2013.01)

(58) Field of Classification Search
CPC ......... H04L 9/16; H04L 9/088; H04L 9/0869; H04L 9/085; H04L 9/0863; G06F 21/602
See application file for complete search history.

(56) References Cited

U.S. PATENT DOCUMENTS

2007/0239615 A1* 10/2007 Matsuzaki ....... G06K 19/07749
705/55
2017/0093564 A1* 3/2017 Bernat ................. H04L 9/0822

OTHER PUBLICATIONS

Adi Shamir, "How to Share a Secret", Nov. 1979, Massachusetts Institute of Technology, vol. 22, No. 11, pp. 612-613. (Year: 1979).*
Shamir, "How to Share a Secret", Communications of the ACM, Association for Computing Machinery, Inc, United States, Nov. 1, 1979, vol. 22, No. 11, pp. 612-613, XP058098024.
Notification of Transmittal of the International Search Report and the Written Opinion of the International Searching Authority (Forms PCT/ISA/220, PCT/ISA/210, and PCT/ISA/237) dated Aug. 28, 2019, in corresponding International Application No. PCT/US2019/032668. (14 pages).

* cited by examiner

*Primary Examiner* — Nelson S. Giddins
(74) *Attorney, Agent, or Firm* — Buchanan Ingersoll & Rooney PC

(57) ABSTRACT

A method for securing a system including a configuration subsystem and a production subsystem. The configuration subsystem is separate from the production subsystem that comprises a plurality of components, a gatekeeper and an entity secured with a first secret value. A generator hosted in the configuration subsystem selects a secret sharing scheme and generates, from an input parameter different from the first secret value, a set of secret shares using the secret sharing scheme. The generator uniquely assigns and securely sends a secret share extracted from the set to each of the components. The gatekeeper gets a subset of the secret shares from the components and constructs a second secret value from the subset using the secret sharing scheme. The gatekeeper computes the first secret value by applying a preset function to the second secret value, and then the gatekeeper unlocks access to the entity using the first secret value.

17 Claims, 2 Drawing Sheets

METHOD FOR SECURING AN AUTOMATED SYSTEM

FIELD OF THE INVENTION

The present invention relates to methods for securing automated systems. It relates particularly to methods of securing an automated system which includes an entity secured with a secret value.

BACKGROUND OF THE INVENTION

Products and services that deal with sensitive data always have a so-called 'last secret'. For example, the secret could be the PIN for accessing a Hardware Security Module (HSM) that protects cryptographic keys. It could also be the password or passphrase that is used to protect or derive other keys for key stores. Traditionally, this last secret is kept and presented by one or more authorized persons. This model does not work in the world of automating everything, where humans are normally not involved in the operation, for example, starting a new instance of a component, once the system is deployed. As a result, the HSM PIN or the password often ends up unprotected in a clear-text configuration file, or even be left disabled. Such a practice puts the whole system and sensitive information in danger. There is a need to mitigate such security risks.

SUMMARY OF THE INVENTION

The invention aims at solving the above mentioned technical problem.

An object of the present invention is an automated system including a configuration subsystem and a production subsystem. The configuration subsystem is separate from the production subsystem that comprises a plurality of components, a gatekeeper and an entity secured with a first secret value. The configuration subsystem comprises a generator including instructions that, when executed by a first processor, cause said generator to select a secret sharing scheme, to generate, from an input parameter different from said first secret value, a set of secret shares using the secret sharing scheme and to uniquely assign and securely send a secret share extracted from the set to each of said components. The gatekeeper includes instructions that, when executed by a second processor, cause said gatekeeper to get a subset of the secret shares from said components, to construct a second secret value from said subset using the secret sharing scheme, to compute the first secret value by applying a preset function to the second secret value and to unlock access to the entity using the first secret value.

Advantageously, the gatekeeper may be configured to get the subset only when access to the entity is about to be made and to delete said first secret value from its memory as soon as access to the entity is unlocked.

Advantageously, the input parameter may include the second secret value.

Advantageously, the gatekeeper may be configured to get the subset by selecting components at random, to choose components in a round-robin fashion among the set or to ask all components of the set and to take the first M responses.

Advantageously, the gatekeeper may be configured to retrieve a second subset of the secret shares from said components, to build a third secret value from said second subset using the secret sharing scheme, to compare said second and third secret values and to compute the first secret value only if said second and third secret values are equal.

Advantageously, the generator may be configured to automatically scale the size of the set of secret shares when a component is removed or a new component is created in the production subsystem.

Advantageously, the generator may be configured to generate a new set of new secret shares and to uniquely assign and securely send a new secret share extracted from said new set to each of said components that replaces its previous secret share with the new secret share.

Advantageously, the preset function may be based on a cryptographic function.

Another object of the invention is a computer-implemented method for securing an automated system including a configuration subsystem and a production subsystem. The configuration subsystem is separate from the production subsystem that comprises a plurality of components, a gatekeeper and an entity secured with a first secret value. The method comprises the successive steps:

a generator hosted in the configuration subsystem selects a secret sharing scheme and generates, from an input parameter different from said first secret value, a set of secret shares using the secret sharing scheme, the generator uniquely assigns and securely sends a secret share extracted from the set to each of said components, the gatekeeper gets a subset of the secret shares from said components and constructs a second secret value from said subset using the secret sharing scheme, the gatekeeper computes the first secret value by applying a preset function to the second secret value, then the gatekeeper unlocks access to the entity using the first secret value.

Advantageously, the gatekeeper may get the subset only when access to the entity is needed and delete said first secret value from its memory as soon as access to the entity is unlocked.

Advantageously, the gatekeeper may get the subset by selecting components at random, by choosing components in a round-robin fashion among the set or by asking all components of the set and taking the first M responses.

Advantageously, the gatekeeper may retrieve a second subset of the secret shares from said components, build a third secret value from said second subset using the secret sharing scheme, compare said second and third secret values and compute the first secret value only if said second and third secret values are equal.

Advantageously, the generator may automatically scale the size of the set of secret shares when a component is removed or a new component is created in the production subsystem.

Advantageously, the generator may generate a new set of new secret shares then uniquely assign and securely send a new secret share extracted from said new set to each of said components that replaces its previous secret share with the new secret share.

Advantageously, the preset function may be based on a cryptographic function.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of automated system comprising a configuration environment and a production environment. It is well-suited for systems including a plurality of components (like services or micro-services) distributed on any number of computers.

Figure 1:
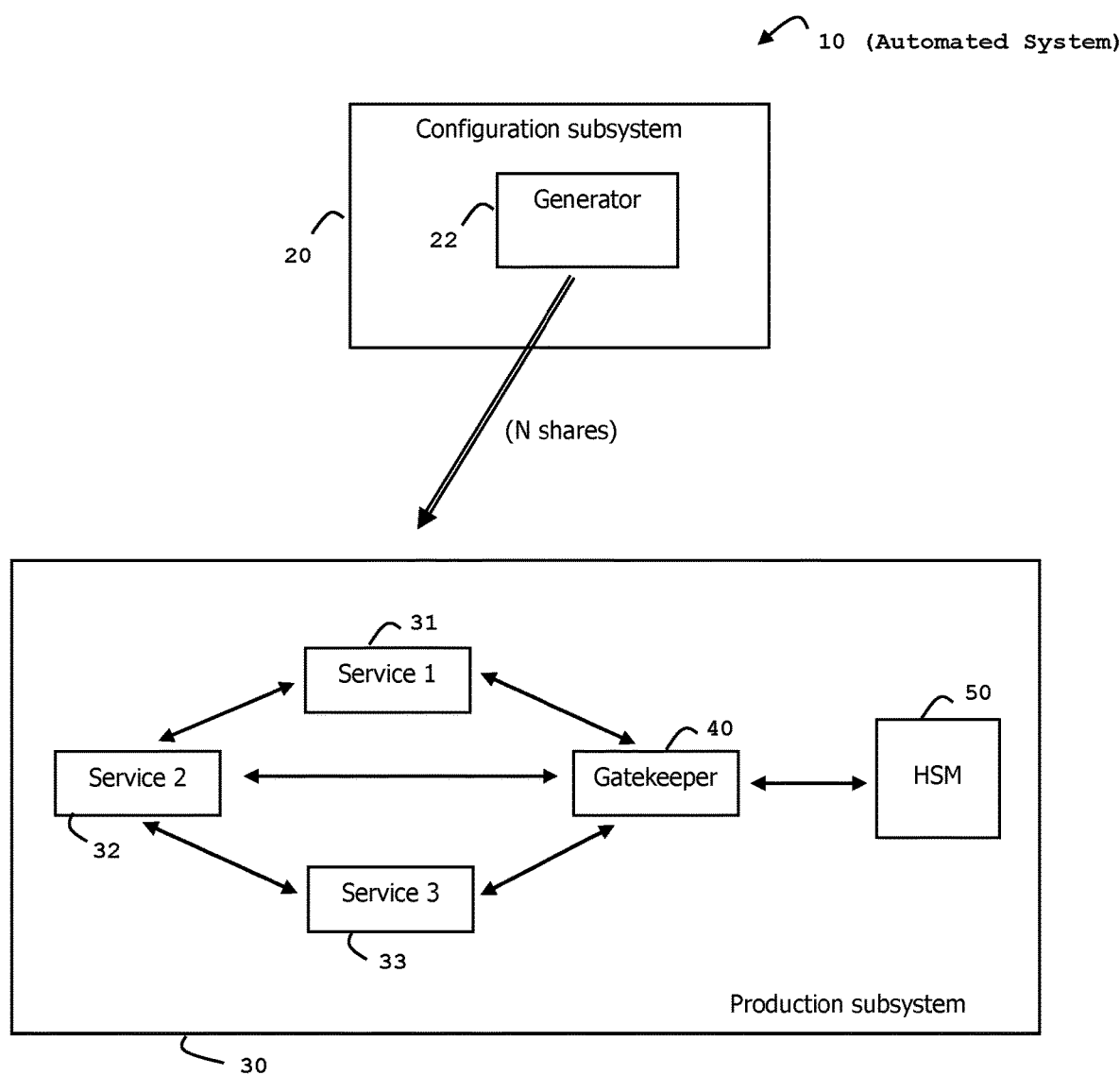
FIG. 1 is an example of architecture of an automated system according to the invention.

FIG. 1 shows an example of architecture of an automated system according to the invention.

In this example, the automated system 10 is deployed in cloud environment.

The automated system 10 comprises a configuration subsystem 20 and a production subsystem 30.

The production subsystem 30 comprises three services 31-33, a gatekeeper 40 and an entity 50 secured with a secret value S (the 'last secret' or ultimate secret value). In this embodiment, the entity 50 is a HSM whose access is protected by the secret value S. Alternatively, the entity 50 may be any secured entity implemented either as a hardware device or a software device.

The gatekeeper 40 and the services 31-33 are software components executed on a plurality of computers. The gatekeeper 40 is designed to communicate with each of the services 31-33 and with the entity 50.

Preferably, the gatekeeper 40 is configured to securely exchanged data with the services 31-33 and the entity 50 using one or several communication protocols providing confidentiality.

The configuration subsystem 20 comprises a generator 22 which is adapted to select a secret sharing scheme. For example, the generator 22 may be set with a default secret sharing scheme or may select at random a secret sharing scheme among several. In another embodiment, the generator may choose a secret sharing scheme according to a data provided by an external entity like a user or computer.

The secret sharing scheme (also named secret splitting scheme) refers to method for distributing an initial secret or the information about the initial secret among several units. Each unit receives a share and the initial secret may be rebuild only if a sufficient number of shares are gathered. Preferably, the secret sharing scheme used by the generator 22 is the Shamir's secret sharing scheme.

The generator 22 is configured to get at least one input parameter (which is assumed to be different from the ultimate secret value S) and to generate, from this input parameter, a set of secret shares using the selected secret sharing scheme. More precisely, the generator 22 uses the generation method of the selected secret sharing scheme to create the secret shares.

The generator 22 is configured to both uniquely assign a secret share extracted from the set to each of the services of the production subsystem 30 and to securely send each allocated secret share to its corresponding service.

In the example of FIG. 1, the generator 22 creates three secret shares SC1, SC2 and SC3. Then it sends SC1 to service 31, SC2 to service 32 and SC3 to service 33. The configuration subsystem 20 is adapted to configure the production subsystem 30 and knows the components (services) of the production subsystem. Thus the generator can have access to the identity/existence of the services which belong to the production subsystem.

The sending of the secret share from the generator to the services may be performed through any of the following methods: writing into a component's configuration, injecting to environment variable of the component, or writing as secret to the orchestration system.

The number of available services is assumed to be large enough considering the number of secret shares to be stored.

The input parameter may comprise a data having a random value and/or configuration data allowing to configure the secret sharing scheme behavior. The input parameter may also comprise the value of a targeted secret S0 so that the secret shares are created in order to allow to reconstruct the targeted secret S0 value.

To support automation, the generator 22 may send secret shares into each production component's configuration (e.g. configuration of each service). For examples, the generator 22 may write into the configuration file or inject via an environment variable of each service. Each component gets its share of the secret from its configuration or environment variables.

In the embodiment of FIG. 1, the generator 22 is a software. Alternatively, the generator 22 may be implemented as a hardware unit (which may include a firmware part).

The gatekeeper 40 is adapted to get a subset of the secret shares from the services 31-33 and to rebuild a reconstructed secret value S0 from said subset using the secret sharing scheme. More precisely, the gatekeeper 40 uses the construction method of the selected secret sharing scheme to build the reconstructed secret value S0.

The generator can send the scheme (for example, a scheme identifier and required parameter, such as k in Shamir's scheme, but not S0) to the gatekeeper using a similar method or different method as the generator sending shares to services. Alternatively, the scheme identifier itself may encode the parameter.

The gatekeeper 40 is also adapted to compute an ultimate secret value S by applying a preset function F to the reconstructed secret value S0. The preset function F may be a cryptographic function or based on basic mathematical functions for instance.

The gatekeeper 40 is configured to unlock access to the entity 50 using the ultimate secret value S.

In one embodiment, the ultimate secret value S may be the value to be presented to the entity 50 to unlock its access (e.g. the PIN or passphrase value). In another embodiment, the final secret value S may be used by the gatekeeper 40 to retrieve the secret value to be presented to the entity 50 to unlock its access. For instance, the gatekeeper 40 can decrypt a stored data with the ultimate secret value S to get the secret value allowing to grant access to the entity 50. In another example, the gatekeeper 40 can use the ultimate secret value S as a seed to derive a key and use that key to decrypt the secret value allowing to grant access to the entity 50.

Preferably, the gatekeeper 40 is configured to both retrieve the subset of secret shares only when access to the entity 50 is about to be made and delete the ultimate secret value from its memory as soon as access to the entity 50 is unlocked. Hence, the ultimate secret value is stored in memory for a very short time, reducing the risk of leakage due to an attack.

The gatekeeper 40 is configured to identify the secret sharing scheme used by the generator 22 to create the secret shares. In one embodiment, the secret sharing scheme may be declared by default in the gatekeeper. Alternatively, the gatekeeper 40 may retrieve an identifier of the secret sharing scheme from the generator 22 through a specific message.

The production subsystem 30 is separate from the configuration subsystem 20. In other words, there is a separation of duty. The configuration subsystem 20 is not aware of the preset function F and cannot find the ultimate secret value S. Conversely, the production subsystem 30 is not aware of the input parameter(s) used by the generator 22.

In addition, it is to be noted that each of the services (of the production subsystem 30) only knows its own secret share and knows neither the used secret sharing scheme, nor the total number of shares, nor the minimum number of shares needed to rebuild the secret value S0.

In one embodiment, the gatekeeper can be designed to retrieve two subsets of the secret shares from the services, to build two secret values from these subsets using the relevant secret sharing scheme, to compare the two secret values and, only if the two secret values are equal, to compute the ultimate secret value.

In one embodiment, the system according to the invention may support key rotation mechanism.

For key rotation, the generator 22 can generate new secret shares. It sends them to the configuration of each of the production components/services or injects them through environment variables. It is to be noted that an update operation via injection does not require services to reboot because they do not use the secret shares themselves. New instances of services will use the new information.

Alternatively, a component (i.e. a service) may request key rotation at the generator 22. A component may authenticate to the generator 22 and use its current secret share to get a new one. The generator 22 generates a new secret share and sends it to the configuration of the component.

The gatekeeper 40 may register at the generator 20 to listen to the key rotation event. When the event happens, the gatekeeper may reconstruct the secret as needed.

Advantageously, the secret sharing scheme is a threshold (cryptography) secret sharing scheme like Shamir's scheme, Blakey's scheme or Asmuth-Bloom scheme. In such a case the generator creates N secret shares and any subset of M shares is sufficient to reconstruct the secret value; where M is lower or equal to N.

When the gatekeeper 40 needs the ultimate secret value, it obtains M secret shares from M services. For example, the gatekeeper 40 can choose M services from the N services at random. In another example, the gatekeeper 40 can choose M services in a round-robin fashion among the N services. In another example, the gatekeeper 40 can ask all N services and take the first M responses.

Implementation-wise, either a service has an API for getting its secret share only by the gatekeeper or the gatekeeper has an API for services to send the secret shares. In either way, the gatekeeper and the services are adapted to authenticate each other.

Figure 2:
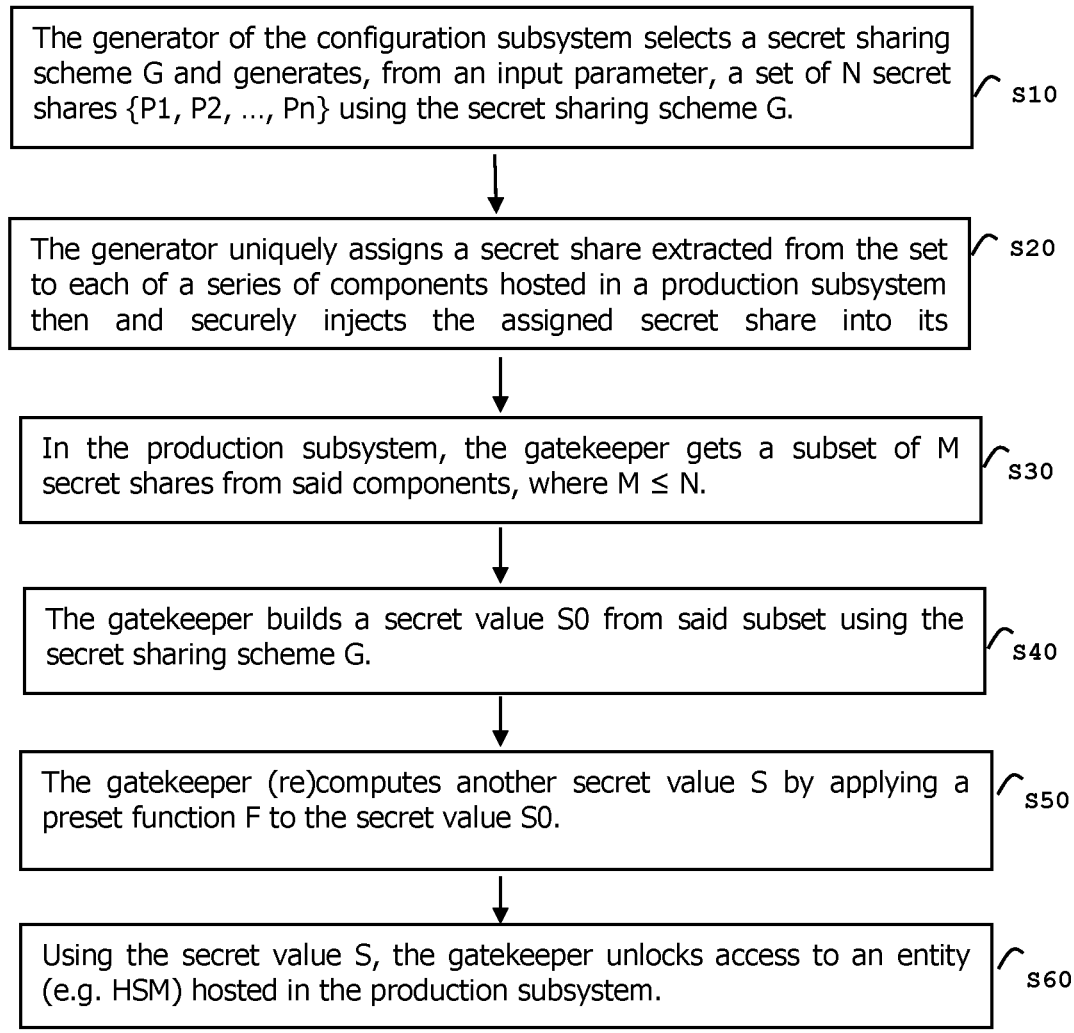
FIG. 2 depicts a flow chart for securing the system according to an example of the invention.

FIG. 2 shows a flow chart for securing an automated system according to an example of the invention.

At step S10, the generator 22 of the configuration subsystem 20 selects a secret sharing scheme G and generates, from an input parameter, a set of N secret shares {P1, P2, . . . , Pn} using the secret sharing scheme G.

At step S20, the generator 22 uniquely assigns a secret share extracted from the set of N shares to each of a series of components (services) hosted in a production subsystem 30 then and securely injects the assigned secret share into its allocated component.

At step S30, in the production subsystem, the gatekeeper 40 gets a subset of M secret shares from the components, where M≤N. In one embodiment, the gatekeeper can establish a secure channel with each of the services in order to get the M shares. For example, each service keeps a gatekeeper's public key certificate for data encryption, and the service encrypts its share using the gatekeeper's public key and sends the encrypted data. For another example, the gatekeeper and a service may use a key agreement scheme such as DH or ECDH to establish a secure channel to transmit the secret share.

At step S40, the gatekeeper 40 rebuilds a secret value S0 from the subset using the secret sharing scheme G.

In one embodiment, the gatekeeper 40 may perform both step S30 and S40 more than once by choosing different subsets of services and, hence, different subsets of secret shares. Thus the gatekeeper 40 can check that the plurality of computed secret value S0 have the same value. If it is not, the gatekeeper can deduce an attack occurred or a fault occurred.

In another embodiment, the gatekeeper 40 may use the Shamir's scheme which is based on a polynomial. It can get at least M+1 secret shares from at least M+1 services. (M being the minimum threshold of needed secret shared). The gatekeeper can use M secret shares to compute the curve and, hence, the secret value S0. It can use the extra share to check that the corresponding point is actually on the curve of the polynomial. This additional check allows to verify that the retrieved M+1 secret shares are consistent.

In another embodiment, the gatekeeper 40 may check the uniqueness of the retrieved secret shares to detect possible fake or malicious component impersonating a legitimate one.

At step S50, the gatekeeper 40 computes the ultimate secret value S by applying a preset function F to the secret value S0.

For example the preset function F may be a cryptographic hash function, such as SHA256 or a key derivation function, such as PBKDF2. In another embodiment, the preset function F may be an identity function I, which means S=I(S0)=S0.

At step S60, using the secret value S, the gatekeeper unlocks access to the secure entity 50 hosted in the production subsystem.

The system of the invention is well-suited for largely distributed components.

Preferably, the generator automatically scales the size of the set of secret shares when a component is removed or a new component is created in the production subsystem. When a new service is added in the production subsystem, the system may be configured to generate or select a secret share and to uniquely allocate it to the new service. If a service is removed from the production subsystem, its corresponding secret share can be discarded or reallocated to another further service.

A secret share is hosted by a service (i.e. component) which offers its initial features without using the secret share. It is to be noted that several secret shares belonging to the same set cannot be allocated to a unique a service. However, several secret shares belonging to different sets may be allocated to a unique a service.

When a new instance of an existing service starts up, it may have the same secret share as the one allocated to other instance(s) of the same service.

A new (additional) gatekeeper instance can run without requiring the existing gatekeeper instance to export or share the secret value. The new gatekeeper instance can compute the secret as described above.

It must be understood, within the scope of the invention, that the above-described embodiments are provided as nonlimitative examples. In particular, the features described in the presented embodiments and examples may be combined.

A single generator can address a plurality of production subsystems or gatekeepers.

The invention allows to reduce the risk of the secret value being leaked or dumped out of memory due to vulnerabilities on the host including those in the CPU, platform, hypervisor or applications.

The architectures of the configuration subsystem and the production subsystem shown at FIG. 1 are provided as examples only. These architectures may be different. For example, the gatekeeper can control access to several secured entities.

Although described in the framework of a HSM equipment, the invention also applies to any type of secured entities.

The invention claimed is:

1. An automated system including a configuration subsystem and a production subsystem,
wherein the configuration subsystem is separate from the production subsystem that comprises a plurality of components, a gatekeeper and an entity secured with a first secret value, said configuration subsystem and production subsystem having a separation of duty;
wherein the configuration subsystem comprises a generator including instructions that, when executed by a first processor, cause said generator to select a secret sharing scheme, to generate, from an input parameter different from said first secret value, a set of secret shares using the secret sharing scheme and to uniquely assign and securely send a secret share extracted from the set to each of said components, said production subsystem being unaware of the input parameter used by the generator;
wherein the gatekeeper includes instructions that, when executed by a second processor, cause said gatekeeper to get a subset of the secret shares from said components, to construct a second secret value from said subset using the secret sharing scheme, to compute the first secret value by applying a preset function to the second secret value and to unlock access to the entity using the first secret value.

2. The system according to claim 1, wherein said gatekeeper is configured to get the subset only when access to the entity is about to be made and the gatekeeper deletes said first secret value from its own memory as soon as access to the entity is unlocked.

3. The system according to claim 1, wherein said input parameter includes said second secret value.

4. The system according to claim 1, wherein said gatekeeper is configured to get the subset by selecting components at random, to choose components in a round-robin fashion among the set or to ask all components of the set and to take the first M responses.

5. The system according to claim 1, wherein the gatekeeper is configured to retrieve a second subset of the secret shares from said components, to build a third secret value from said second subset using the secret sharing scheme, to compare said second and third secret values and to compute the first secret value only if said second and third secret values are equal.

6. The system according to claim 1, wherein the generator is configured to automatically scale the size of the set of secret shares when a component is removed or a new component is created in the production subsystem.

7. The system according to claim 1, wherein the generator is configured to generate a new set of new secret shares and to uniquely assign and securely send a new secret share extracted from said new set to each of said components that replaces the previously assigned secret share with the new secret share.

8. The system according to claim 1, wherein said preset function is based on a cryptographic function.

9. The system according to claim 1, wherein at least one of said components is configured to authenticate to the generator and to use the secret share which is uniquely assigned to said at least one component to get a new secret share from the generator.

10. The system according to claim 1, wherein the secret sharing scheme is the Shamir's scheme which is based on a polynomial that defines a curve, M being the minimum threshold of needed secret shared to reconstruct the second secret value, wherein the gatekeeper is configured to get M+1 secret shares from the components, to use M secret shares to compute a curve and to use the extra share to check that the corresponding point is actually on the curve of the polynomial.

11. A computer-implemented method for securing an automated system including a configuration subsystem and a production subsystem,
wherein the configuration subsystem is separate from said production subsystem which comprises a plurality of components, a gatekeeper and an entity secured with a first secret value, said configuration subsystem and production subsystem having a separation of duty;
wherein the method comprises the successive steps:
a generator hosted in the configuration subsystem selects a secret sharing scheme and generates, from an input parameter different from said first secret value, a set of secret shares using the secret sharing scheme, said production subsystem being unaware of the input parameter used by the generator;
the generator uniquely assigns and securely sends a secret share extracted from the set to each of said components,
the gatekeeper gets a subset of the secret shares from said components and constructs a second secret value from said subset using the secret sharing scheme,
the gatekeeper computes the first secret value by applying a preset function to the second secret value, then
the gatekeeper unlocks access to the entity using the first secret value.

12. The method according to claim 11, wherein said gatekeeper gets the subset only when access to the entity is needed and the gatekeeper deletes said first secret value from its own memory as soon as access to the entity is unlocked.

13. The method according to claim 11, wherein the gatekeeper gets the subset by selecting components at random, chooses components in a round-robin fashion among the set or asks all components of the set and takes the first M responses.

14. The method according to claim 11, wherein the gatekeeper retrieves a second subset of the secret shares from said components, builds a third secret value from said second subset using the secret sharing scheme, compares said second and third secret values and computes the first secret value only if said second and third secret values are equal.

15. The method according to claim 11, wherein the generator automatically scales the size of the set of secret shares when a component is removed or a new component is created in the production subsystem.

16. The method according to claim 11, wherein the generator generates a new set of new secret shares then uniquely assigns and securely sends a new secret share extracted from said new set to each of said components that replaces the previously assigned secret share with the new secret share.

17. The method according to claim 11, wherein said preset function is based on a cryptographic function.

* * * * *